Oct. 29, 1957  H. CHEVALLAZ  2,811,075
CINEMATOGRAPHIC CAMERA WITH VIEWFINDER PRISM
PIVOTED FOR CLEANING
Filed June 3, 1955  2 Sheets-Sheet 1

INVENTOR
HENRI CHEVALLAZ
By

Oct. 29, 1957  H. CHEVALLAZ  2,811,075
CINEMATOGRAPHIC CAMERA WITH VIEWFINDER PRISM
PIVOTED FOR CLEANING
Filed June 3, 1955  2 Sheets-Sheet 2
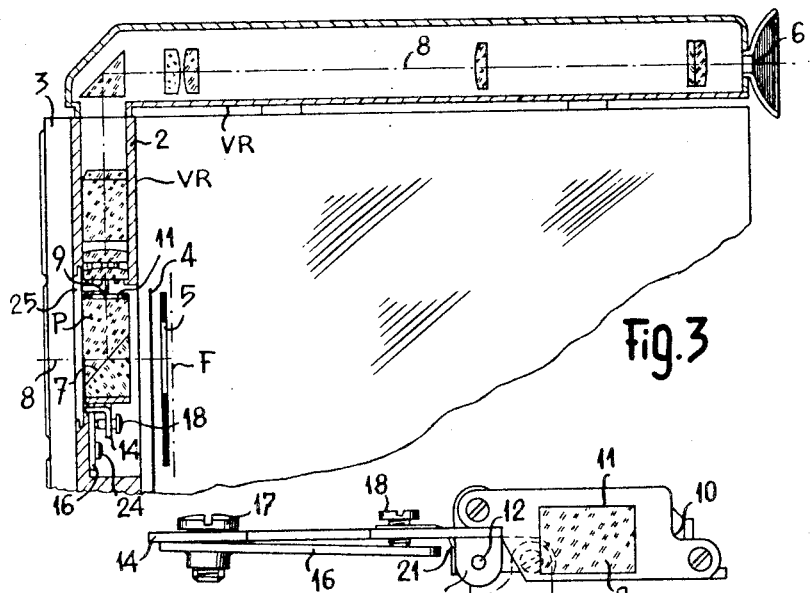
Fig. 3
Fig. 5
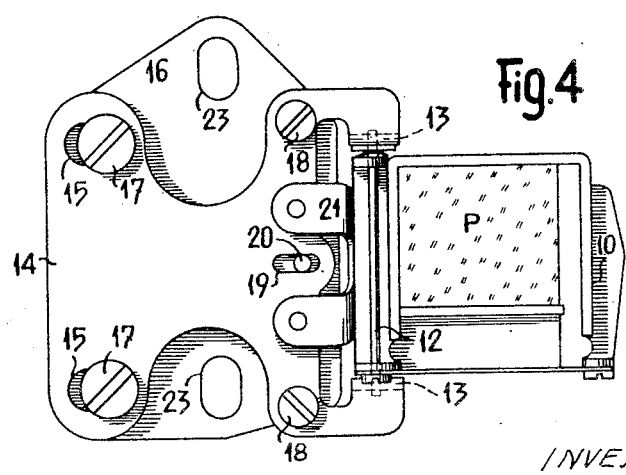
Fig. 4
INVENTOR
HENRI CHEVALLAZ

2,811,075

CINEMATOGRAPHIC CAMERA WITH VIEW-FINDER PRISM PIVOTED FOR CLEANING

Henri Chevallaz, Yverdon, Switzerland, assignor to Paillard S. A., Sainte-Croix, Switzerland, a corporation of Switzerland Application June 3, 1955, Serial No. 513,030

Claims priority, application Switzerland June 16, 1954

7 Claims. (Cl. 88—16)

The present invention relates to a cinematographic camera comprising an objective support, particularly a turret and a stationary reflex viewing device, said latter comprising a prism located between the objective and the shutter.

Cameras of this character are known, but have the disadvantage of not permitting of free access to the rear face of said prism for effecting its cleaning.

The camera according to the invention tends to remedy the above mentioned disadvantage and is distinguished from known cameras by the fact that the said prism is mounted in a frame hinged relatively to the camera casing, so that a pivoting of the frame enables the prism to be brought into a position enabling its rear face to be cleaned.

One form of construction of a camera according to the invention is shown diagrammatically and by way of example in the accompanying drawings, wherein:

Fig. 3 is a section on the line III—III of Fig. 1.

Figs. 4 and 5 show, to a larger scale, two views of the prism and of its hinged frame.

Figure 1:
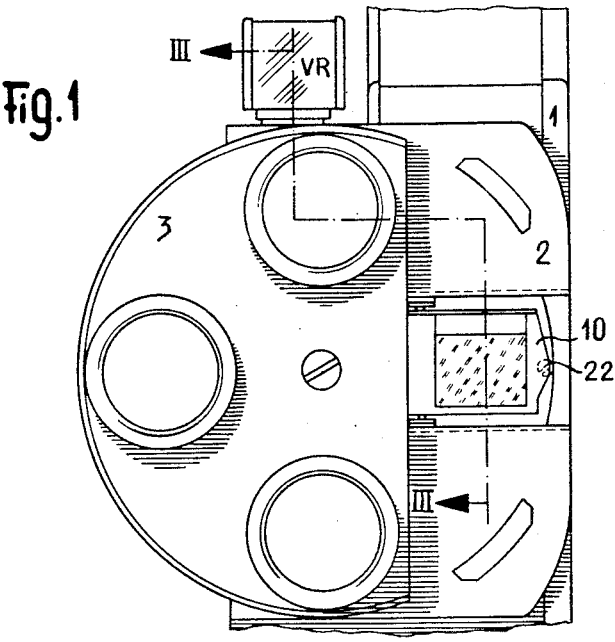
Fig. 1 is a front view, the turret being in a position in which the prism is uncovered and accessible.

The cinematographic camera shown partly in the drawings comprises, particularly, a casing 1, a supporting turret 2, an objective carrying turret 3, a reflex viewing device VR, a shutter 4 and a photographing window 5. The plane of the film is indicated by F.

The reflex viewing device VR is formed by an eyepiece 6 and a series of lenses and prisms of which a prism P is located between the objective (not shown) and the shutter 4. The prism P comprises a semi-reflecting surface 7 adapted to reflect a portion of the luminous beam passing from the objective on to the film, towards the eyepiece 6 as indicated in Fig. 3 by the axial ray 8. In the upper face, the prism P comprises an unpolished surface 9 in which the reflected image is formed. The prism P is mounted in a frame 10 which comprises, opposite the said unpolished surface 9, a window 11 of which the opening is smaller than the opening of the photographing window and which is the same size as the opening of the projector for the film which is exposed in this camera. Thus, the operator is able to observe with this reflex viewer the scenes as they will appear during the projection of the developed film. A spindle 12, rigidly secured to one of the sides of the frame 10, is capable of turning by its ends in the bearings provided in the lugs 13 of a plate 14. The latter comprises, at the end thereof opposed to the lugs 13, two elongated holes 15 by which it is secured to another plate 16 by means of screws 17. Two screws 18 are screwed into the plate 14 and, passing through this, bear against the plate 16. The plate 14 also comprises an elongated opening 19 adapted to co-operate with a pin 20 secured to the plate 16, in such a manner as to ensure a horizontal movement of the plate 14 on said latter. A blade spring 21, secured to the plate 14, bears against the frame 10 tending to maintain it applied against a screw 22 (see Fig. 1), when the prism is in the operative position.

The plate 16 comprises two elongated openings 23 by means of which it is secured to the turret support 2 by means of screws 24 (Fig. 3).

A seating 25, provided in the turret support 2, enables a filter to be placed between the objective and the prism P.

As will be seen from the foregoing description, the plates 14 and 16 constitute a support to which is hinged the frame 10 in which the prism P is mounted. When the prism is in the operative position, as shown in Fig. 1, the frame is applied, by the action of the spring 21, against the screw 22 screwed into the turret support 2.

The focusing of the image on the unpolished surface 9 is obtained by the movement of the prism P parallel to the optical axis of the objective. This movement is possible by reason of the two screws 18 and the screw 22. In fact, the elasticity of the plate 14 enables the screws 18 to vary the distance between its end comprising the lugs 13 and the plate 16. The prism P may thus be moved along the optical axis of the objective and the screw 22 permits of ensuring that this movement of the prism P takes place parallel to itself.

The centering of the window 11 relatively to the window 5 is obtained, on the one hand, by the vertical movement of the plate 16 on the turret support 2, by reason of the elongated openings 23 and, on the other hand, by the horizontal movement of the plate 14 on the plate 16 by reason of the elongated holes 15.

Figure 2:
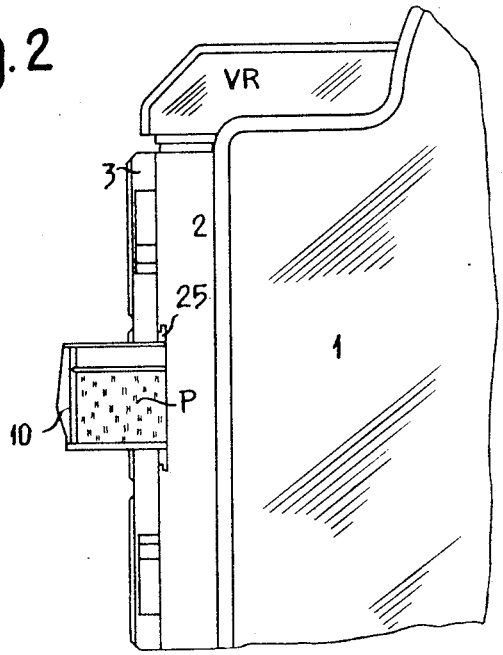
Fig. 2 is a side view, the prism being in a position enabling its rear face to be cleaned.

When it is desired to proceed with the cleaning of the rear face of the prism P, the turret 3 is moved into the position in which the prism P is completely uncovered, as shown in Fig. 1. In fact, as will be seen in Fig. 1, the turret 3 has a substantially semi-circular shape, so that, in a predetermined angular position, it allows the prism P carried by the frame 10, to appear. Then the free end of the frame 10 is gripped and, by pulling it outwards, the spindle 12 is caused to pivot in the lugs 13, against the action of the spring 21, until the frame has moved angularly through approximately 90° (position shown in dotted lines in Fig. 5) when the action of the spring ceases by reason of the shape imparted to the frame. In this position of the frame, the rear face of the prism P is completely accessible for cleaning (see Fig. 2).

After cleaning, the frame carrying the prism is returned to its operative position (Fig. 1) and the turret can be moved in such a manner as to bring one of the objectives in front of the prism.

As will be seen from the foregoing, the construction of the camera above described renders it possible, in an easy manner, to clean the rear face of the prism placed between the objective and the shutter.

I claim:

1. A cinematographic camera comprising an objective carrier, an objective on said carrier, a shutter mounted in said camera, said objective carrier including a turret and a stationary reflex viewing device, said reflex viewing device comprising a prism placed between said objective and said shutter, said prism having a polished and an unpolished surface, said prism being mounted in a frame hinged relatively to the camera casing, said frame being hinged to a support secured to the casing of said camera, the said support being formed by two plates, the first of said plates being secured in an adjustable manner to said casing of the camera, the second of said plates being secured, also in an adjustable manner, on said first plate and comprising two lugs substantially parallel to the optical axis of the objective, said lugs carrying the hinge axis of the said frame on said support, whereby a pivoting of said frame enables said prism to be brought into a position enabling its rear face to be cleaned and whereby the window of the frame can be centered relatively to the photographing window of the camera.

2. A camera according to claim 1, wherein said support of the frame is adjustable parallel to the optical axis of the objective, in such a manner as to permit of focussing the image on the unpolished surface of said prism.

3. A motion picture camera comprising, in combination, a casing, an objective carrier, said objective carrier including a turret and a stationary reflex viewing device, an objective on said turret, a shutter mounted in said camera, a photographing window positioned in said camera rearwardly of said shutter, said reflex viewing device including a prism positioned between said objective and said shutter, said prism being positioned forwardly of said shutter, a support secured to said casing, said support being formed by two plates, the first of said plates being adjustably secured to said objective carrier and the second of said plates being adjustably secured to said first plate, said second plate including two lugs substantially parallel to the optical axis of the objective, a spindle positioned between said two lugs, said spindle being rotatably secured to said two lugs at the respective ends thereof, a frame rigidly secured to said spindle at one of the sides thereof, said prism being mounted in said frame, said prism having a polished surface and an unpolished surface, said frame having a window opposite said unpolished surface, whereby said lugs carry the hinge axis of said frame on said support and the frame is hinged relatively to the casing thereby enabling the pivoting of said frame and prism to position the prism for cleaning its rear face and whereby the frame window opposite said unpolished surface of the prism can be centered relatively to the photographing window of the camera.

4. The motion picture camera of claim 3 including means for adjusting the support of the frame having the prism positioned therein parallel to the optical axis of the objective, said means being operatively associated with said first and second plates, whereby the image can be focused on the said unpolished surface of the prism.

5. A motion picture camera comprising, in combination, a casing, a first turret fixedly secured to said casing, a second turret, said second turret being mounted on said first turret for angular movement with respect thereto, a stationary reflex viewing device mounted in said first turret, a shutter mounted in said camera, a photographing window positioned in said camera rearwardly of said shutter, an objective on said second turret, a frame hingedly mounted on said first turret, said reflex viewing device including a prism positioned between said objective and said shutter, said prism being forwardly of said shutter, said prism being mounted in said frame, said prism having a polished surface and an unpolished surface, whereby said frame and the prism mounted therein are hinged relatively to said casing thereby enabling said prism mounted in said frame to be so pivoted into a position for exposing its rear face to be cleaned.

6. The motion picture camera of claim 5 wherein said frame includes in the side opposite the unpolished surface of said prism a window having an opening substantially of the same shape and cross-sectional area as the window of a projector for the film to be exposed in the camera, whereby the exact scene which is recorded by the film during its exposure and which will be seen during projection can be viewed during the exposure of the film.

7. The motion picture camera of claim 5 including spring means for urging said frame and said prism mounted therein into operative position in said stationary reflex viewing device, said spring means being operatively associated with said first turret.

References Cited in the file of this patent

UNITED STATES PATENTS

| | | |
|---|---|---|
| 1,991,311 | Barbieri | Feb. 12, 1935 |
| 2,219,314 | Hoch | Oct. 29, 1940 |

FOREIGN PATENTS

| | | |
|---|---|---|
| 484,625 | Germany | Oct. 22, 1929 |